April 22, 1941.                A. W. MILLER ET AL                2,239,241
                        AUTOMATIC MOTION PICTURE MACHINE
                        Filed Nov. 27, 1939            6 Sheets-Sheet 2

A. W. Miller
J. H. McMahon INVENTORS
BY *signature*
ATTORNEYS.

April 22, 1941.   A. W. MILLER ET AL   2,239,241
AUTOMATIC MOTION PICTURE MACHINE
Filed Nov. 27, 1939   6 Sheets-Sheet 4

A. W. Miller
J. H. McMahon
INVENTORS

BY *CASnow&Co.*
ATTORNEYS.

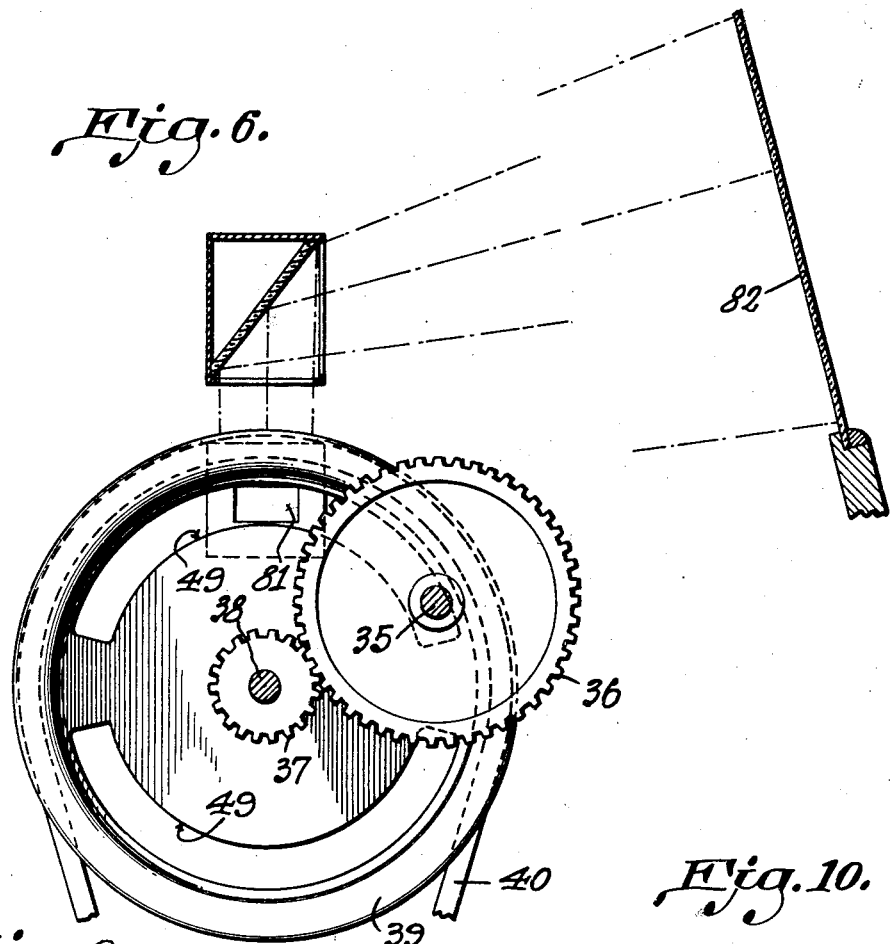
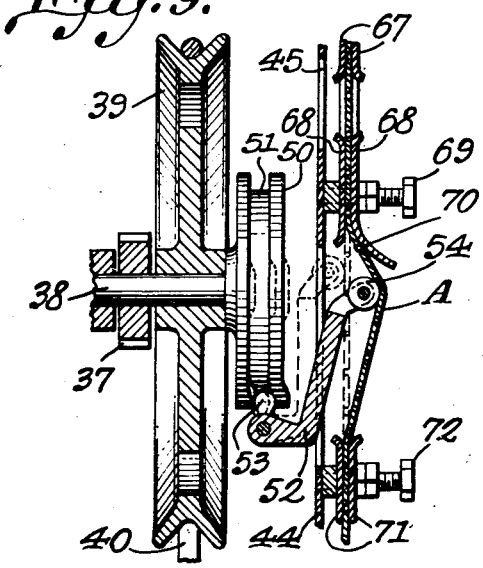
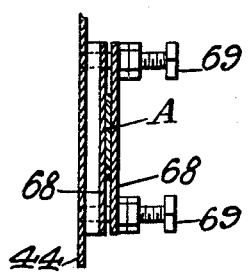

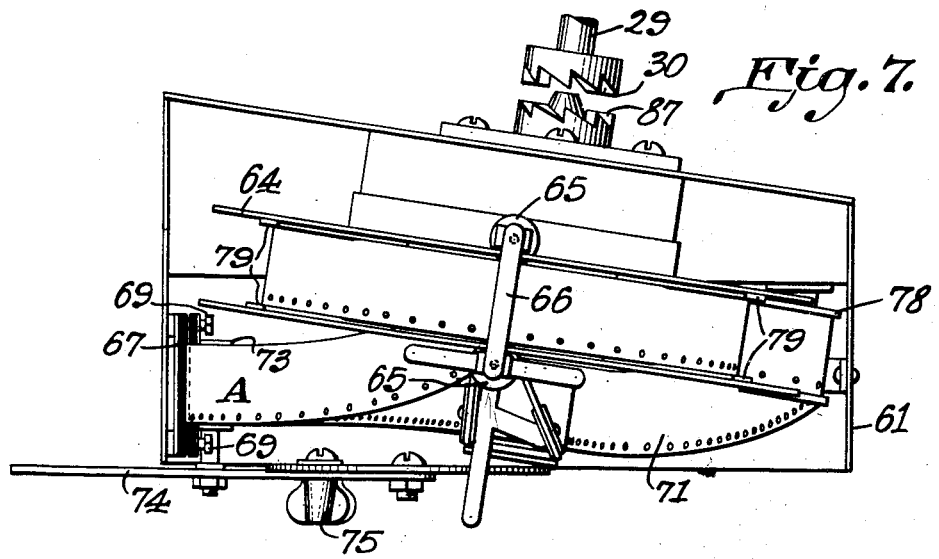

Patented Apr. 22, 1941

2,239,241

REISSUED

UNITED STATES PATENT OFFICE 2,239,241

AUTOMATIC MOTION PICTURE MACHINE

Arthur W. Miller and John H. McMahon, Albany, Calif.

Application November 27, 1939, Serial No. 306,386

8 Claims. (Cl. 88—24)

This invention relates to an automatic coin-operated motion picture projecting apparatus, the primary object of the invention being to improve generally the mechanisms as set forth in my pending application, Serial No. 171,236 filed October 27, 1937 and which has become U. S. Patent No. 2,180,638, dated November 21, 1939, and my application Serial No. 183,110 filed January 3, 1938, which has become U. S. Patent No. 2,180,639, dated November 21, 1939, which applications cover the coin-controlled mechanism omitted in the present application.

An important object of the present invention is to provide means for feeding the film strip before the projector opening of the machine, by frictional contact with the film strip, eliminating the use of the well known film feed wherein a sprocket cooperates with lines of openings formed along the edges of the film strip to feed the film strip before the projector.

Another object of the invention is to provide novel means whereby a selected film strip may be brought into operative position before the projector, and held in such position for a predetermined period to permit the film to be run off.

A still further object of the invention is to provide a movable lamp housing together with means for moving the lamp housing into and out of operation, with each movement of the apparatus to change the film strip being displayed.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 6 is a view illustrating the film feed pulley, illustrating the openings therein, through which the light rays are projected.

Figure 7 is a plan view illustrating one of the film reels as mounted within a reel housing.

Figure 8 is a sectional view through the reel housing and reel supported therein.

Figure 9 is a vertical sectional view through the film strip mechanism.

Figure 10 is a sectional view through the guide plates between which the film is fed.

Figure 1:
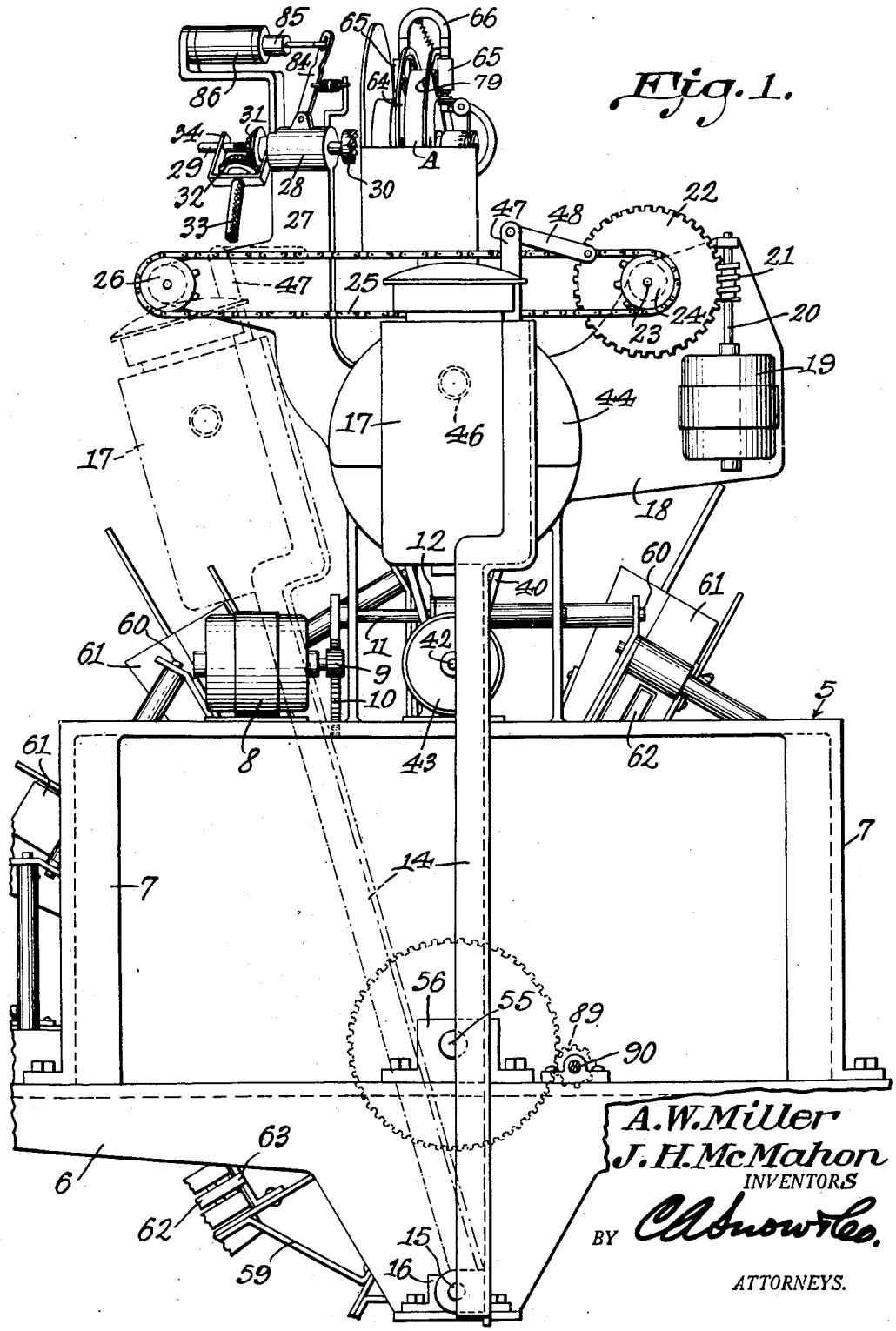
Figure 1 is an elevational view of one section of the rotor, showing the section as moved before the projector.

Referring to the drawings in detail, the device comprises a stator and a rotor, the stator being indicated generally by the reference character 5.

The stator embodies a supporting bar 6 and a rectangular supporting frame 7 adapted for mounting in a suitable cabinet not shown.

Mounted on the upper bar of the frame 7, is the motor 8, the shaft thereof being provided with a pinion 9 that meshes with the teeth of the segmental gear 10 mounted on the shaft 11 to move therewith.

Keyed or otherwise secured to the shaft 11 to move therewith, is a curved arm 12 which is provided with a roller 13 at its free end.

The reference character 14 designates an arm which rises from the shaft 15 that in turn is mounted in the bearing 16 carried by the stator.

The arm 14 provides the support for the lamp housing or projector 17 which is adapted to swing with the arm 14, for purposes to be hereinafter more fully described.

Mounted on the support 18 forming a part of the stator, is an electric motor 19, the motor shaft 20 thereof being supplied with the worm gear 21 that meshes with the gear 22 that is also mounted on the support 18. The shaft 23 on which the gear 22 is mounted, also provides a support for the sprocket 24 over which the chain 25 operates, the chain 25 also operating over the sprocket 26 mounted on a shaft carried by the arm 27 that forms a part of the stator.

Formed at the upper end of the arm 27 is a bearing 28 through which the shaft 29 extends, the shaft 29 carrying the clutch face 30 at one of its ends. Mounted on the opposite end of the shaft 29 is a beveled pinion 31 that meshes with the beveled pinion 32 carried at the upper end of the flexible shaft 33, the upper end of the flexible shaft 33 being mounted in a bearing formed in the U-shaped bearing support 34.

The lower end of the flexible shaft 33 is shown as connected with the shaft 35 that carries the pinion 36 at one end thereof, the pinion 36 meshing with the pinion 37 mounted on the shaft 38 that carries the pulley 39 adjacent to its inner end, the pulley 39 being rotated by means of the belt 40 operating over the pulley 41 which is mounted on the outer end of the motor shaft 42, and which is operated by the motor 43. Thus it will be seen that when the motor 43 is operating, the pulley 39 is rotated which in turn transmits movement to the flexible shaft 33 and shaft 29.

The pulley 39 is mounted within the housing 44 which is formed with aligning projector openings 45 with which the projector tube 46 aligns in projecting light rays onto the film, to be hereinafter more fully described.

An arm indicated at 47 extends upwardly from the lamp housing or projector 17, and connects with the link 48, that has one end thereof connected with the chain 25. Thus it will be seen that as the sprocket 22 is rotated, and the chain 25 is moved over the sprockets 24 and 26, the lamp housing or projector 17 will be moved from the dotted line position shown by Figure 1 of the drawings, to the position shown in full lines in Figure 1 of the drawings, or vice versa.

The pulley 39 is formed with elongated arcuate-shaped openings 49 that align with the projector openings 45 at predetermined intervals, to allow light rays from the projector to be projected through the housing 44 and onto the film strip passing through the film guides, forming a part of the rotor, to be hereinafter more fully described.

On the inner end of the shaft 38 is a wheel 50 formed with a cam groove 51 in the periphery thereof. Pivotally mounted adjacent to the wheel 50, is a film strip feed arm 52 which is provided with a headed finger 53 arranged to move in the cam groove 51. The opposite end of the arm 52 is provided with a roller 54 adapted to move over the film strip operating through the machine, and which in the present showing is indicated at A.

The rotor forming a part of the apparatus, is mounted on the shaft 55 that has its ends journalled in the bearings 56 mounted on the supporting frame. The rotor comprises a hub section 57 from which the arms 58 radiate. These arms 58 are substantially long, and are held in spaced relation with respect to each other, by means of the bars 59, which are bolted to adjacent arms 58.

The arms 58 are formed with bearing openings at their ends, for the reception of the shafts 60, each shaft providing a support for a motion picture reel housing, indicated at 61. The inner end wall of each motion picture reel housing 61 is formed with a slot for the reception of the pivoted latch member 62, the latch members being supported with respect to the ends of the housings 61, that one of the respective edges thereof extends beyond the end walls of the housings. A finger indicated at 63 extends from each latch member and is adapted to engage the bar 59 associated therewith, normally holding the motion picture reel housings 61, in their inactive positions. In operation, the arms 12 swing inwardly, the rollers 13 thereof engaging the latch members, moving the latch members inwardly to cause the fingers thereof to disengage the bars 59, releasing the motion picture reel housings so that they may swing to their active positions. Due to the fact that the latch member 62 operates through slots in the lower ends of the housings 61, it will be seen that when the latch members are forced inwardly by the rollers 13, the latch members are moved to predetermined positions, the rollers 13 contacting with the bottoms of the motion picture reel housings, limiting further movement of the arm 12, with respect to the housings 61. As the arm 12 moves to the limit of its inward movement, it will be seen that the motion picture housing associated therewith, is moved upwardly to its vertical or active position. Pivotally mounted within each motion picture reel housing, is a reel 64 on which a film strip is wound. The film strip which is indicated at A, moves between the guide rollers 65 mounted on opposite sides of the reel, the rollers being spaced apart so that they will contact the edges of the film strip being wound or unwound from the reel, holding the film strip in proper position. Pins extend upwardly from the shaft of the rollers 65, and extend into the sockets formed at the ends of the retainer 66 that is fitted over the film strip, to prevent the film strip from moving upwardly between the rollers. It will of course be understood that the film strip unwinds from the central or hub portion of the reel, and rewound on the reel at the periphery thereof.

The projector opening formed in each reel housing, is arranged so that when the reel housing is moved to its active position, the projector opening will align with the projector openings of the housing 44, forming a part of the stator.

Pairs of guide plates indicated at 67 and 68 are arranged on opposite sides of the projector opening of each housing 61, the plates of each pair being adjusted with respect to each other, by means of the set screws 69. Thus it will be seen that due to this construction, the frictional contact between the guide plates and film strip A moving therethrough, may be regulated.

As clearly shown by Figure 9 of the drawings, the innermost plate of the lower pair of guide plates is substantially long, and provided with a pin 70 adapted to be extended into an opening formed in the film strip passing between the guide plates. The openings of the film strip are arranged in predetermined spaced relation with respect to each other, or the distance between the pictures on the film strip, so that the pictures will be accurately framed within the projector opening.

Arranged directly under the pairs of guide plates 67 and 68, are guide plates 71, the friction between the guide plates being regulated by the set screw 72. The film strip in passing through the machine, moves through the guide plates 67, 68 and 71, the guide plates 71 being spaced an appreciable distance from the guide plates 68, providing a space for the roller 54 carried at the upper end of the feed arm 52, to engage the film strip. The tension or frictional contact between the guide plates 71 is greater than the frictional contact between the guide plates 68, with the result that when the feed arm 52 is moved inwardly to its full line position as shown by Figure 9 of the drawings, the film strip will be moved downwardly and fed through the machine. As the film strip passes through the guide plates 71, the film strip moves over the pulley 73 mounted at the free end of the arm 74 that is pivotally mounted within the housing 61, there being provided a set screw 75 for holding the arm 74 in various positions of adjustment, to further tension the film strip. From the pulley 73, the film strip moves upwardly over the pulley 76 and is formed into a loop indicated at 77, from where the film strip passes over the pulley 78 and onto the reel.

It might be further stated that ribs 79 are formed on the inner surfaces of the spool 64 on which the film strip is wound, the ribs being of thicknesses so that the edges of the film strip will contact therewith without danger of binding. It will be seen that due to this construction, friction between the film strip and side members of the spool is reduced to a minimum, to insure the operation of the device.

When the projector and a reel housing have been moved to their active positions, light rays will be projected onto the film strip and reflected upwardly by the reflector 81 where the pictures will be projected upwardly onto the screen 82 where they may be viewed by the person using the machine.

The means for operating the shaft 29 and clutch 30, comprises a lever 84 to which the core 85 of the solenoid 86 is connected. Thus it will be seen that when the solenoid 86 is energized, the core will be drawn into the winding of the solenoid, moving the lever 84 and projecting the shaft 29 causing the clutch face 30 thereof to engage the clutch face 87, mounted on the shaft 88, on which the film reel or spool is mounted to rotate therewith.

It might be further stated that the hub section 57 is provided with teeth that mesh with the teeth of the pinion 89 mounted on one end of the motor shaft 90 which is operated by the selecting mechanism of the machine not shown. Thus it will be seen that due to this construction, when the pinion 89 is rotated, the hub 57 will be rotated on the shaft 55, moving the selected picture reel housing, together with the picture strip carried thereby, into registry with the projector openings of the machine so that light rays projected through the openings, will be directed to the film strip, displaying the film strip on the screen of the machine.

Figure 2:
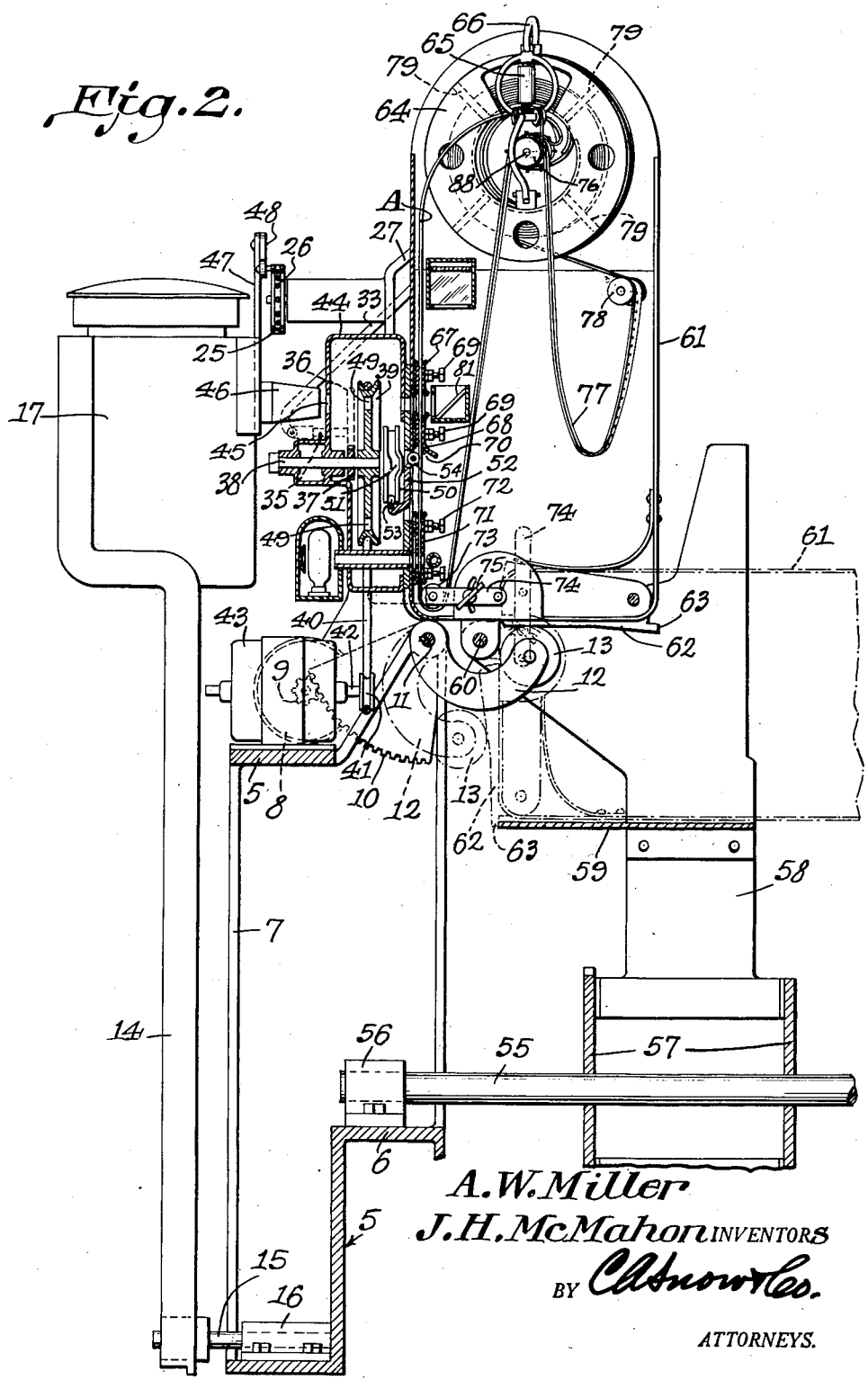
Figure 2 is a vertical sectional view through one of the film reel supporting housings and operating means for operating the film.
Figure 3:
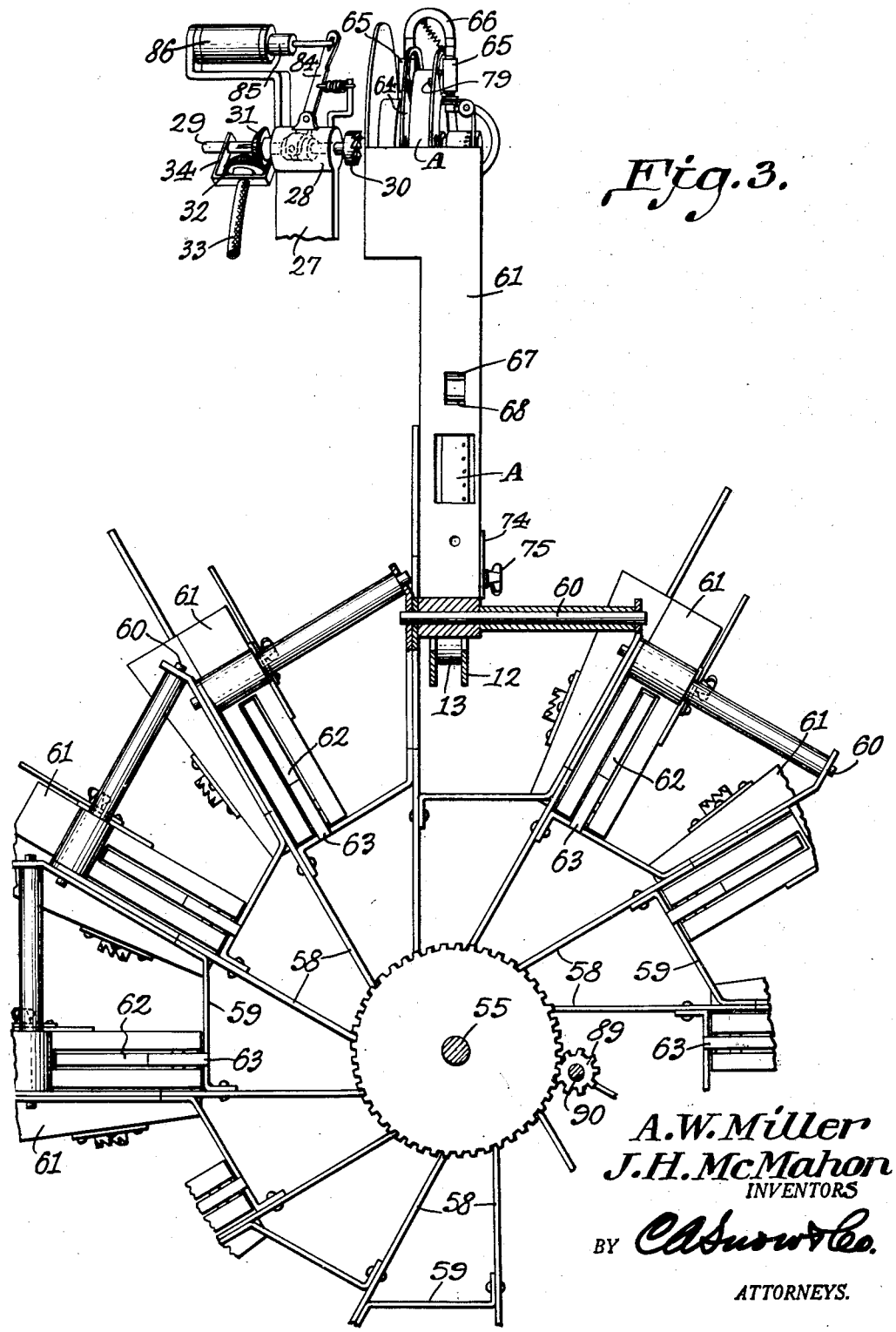
Figure 3 is an elevational view of the rotor and illustrating one of the film housings as moved to its active or operative position.
Figure 4:
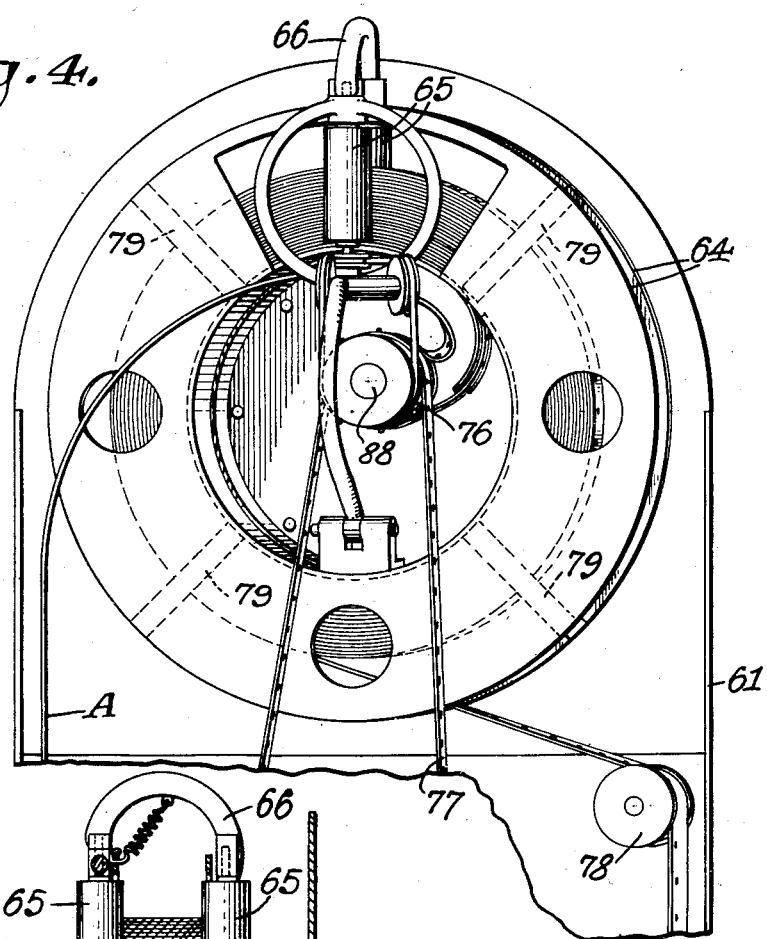
Figure 4 is an enlarged elevational view illustrating a reel as supported in a reel housing.
Figure 5:
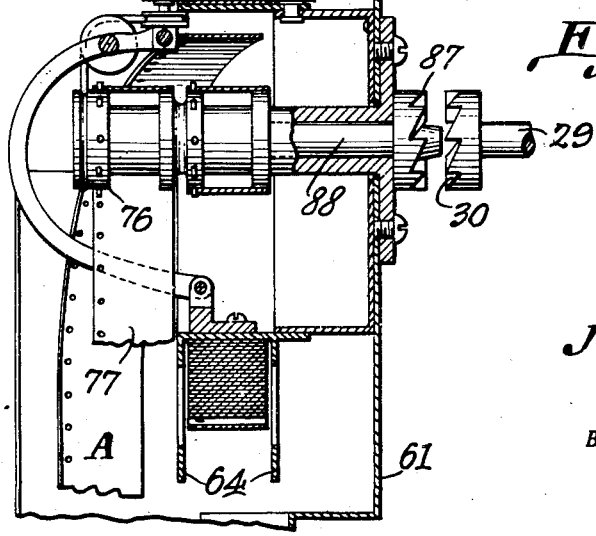
Figure 5 is a sectional view taken through the reel as shown by Figure 4.

In the operation of the apparatus, the selecting means illustrated in my pending application hereinbefore mentioned, is operated. The motor 8 is set into operation, which motor operates the pinion 9 meshing with the segmental gear 10. The segmental gear operates the arm 12 which carries the roller 13 and which moves against the latch member of the picture strip projecting unit moved adjacent thereto. As the roller engages the latch member, the latch member is moved inwardly releasing the picture strip projecting unit. Upon further movement of the arm 12, the picture strip projecting unit is moved from the dotted line position shown by Figure 2 of the drawings, to the full line position as shown by Figure 2. With the picture strip projecting unit in this position, it is ready for displaying the picture strip which is mounted on the reel of the picture strip projecting unit.

The clutch member 29 is now moved into engagement with the clutch member 87 with the result that the reel 64 is rotated to cause the picture strip thereon to be fed from the reel. As the picture strip moves before the projector opening, the feed arm 52 contacting with the film strip causes the film strip to be intermittently fed before the projector opening between the lamp housing and screen. Because the pulley 39 is provided with elongated openings 49, the pulley will act as a shutter, allowing light rays to be projected onto the picture strip intermittently, or at a time when a picture of the strip is exactly framed within the projector opening.

It might be further stated that as the film strip moves past the projector opening, it is returned to the reel, and rewound thereon for further use.

What is claimed is:

1. In a motion picture machine, a frame, a picture screen supported on the frame, a stator and rotor mounted on the frame in front of said picture screen, a movable arm forming a part of the stator, a projector housing secured to the free end of the movable arm, radiating arms mounted on the rotor, independently operable picture-projecting units at the free ends of the radiating arms, means for selectively moving the arms and picture-projecting units into operative projecting relation with respect to the screen, and means for moving said movable arm and projector housing into projecting relation with respect to the picture-projecting units and screen.

2. In a motion picture machine, a frame, a picture screen supported on the frame, a stator and rotor mounted on the frame directly in front of the picture screen, a movable arm mounted on the stator, a projector housing on the free end of said arm, means for moving the arm and projector housing into projecting relation with the screen, a plurality of picture-projecting units mounted upon and forming a part of the rotor, and means for swinging said picture-projecting units selectively into projecting relation between the projector housing and screen.

3. In a motion picture machine, a frame, a picture screen supported on the frame, a stator and rotor mounted on the frame, a projecting medium on the stator, a plurality of picture-projecting units mounted on the rotor and adapted to move between the projecting medium and screen to direct light rays onto the screen, means for moving said projecting units selectively into operative projecting relation, each of said units embodying a picture strip, spaced pairs of guides through which the picture strip moves, said guides frictionally engaging said picture strip, restricting movement of the picture strip through the guides, a pivoted arm mounted on the frame and adapted to move into engagement with the picture strip between the guides forcing the strip inwardly and pulling the picture strip through one of the guides, feeding the strip through the machine.

4. In a motion picture projecting machine, a frame, a stator and rotor mounted on the frame, a picture screen mounted on the frame, a pivoted lamp housing forming a part of the stator and adapted to direct light rays onto the screen, independently operable picture-projecting units forming a part of the rotor and adapted to move between the picture screen and lamp housing whereby light rays may pass through the projecting units onto the screen, means for moving said projecting units into operative projecting relation, each picture unit including a picture strip, upper and lower guides between which said picture strip moves, said guides adapted to frictionally grip the picture strip, means for pressing the picture strip inwardly at a point between the guides, one of said guides adapted to grip the picture strip with greater pressure than the adjacent guide whereby the picture strip is fed through the machine in one direction.

5. In a motion picture projecting machine, a frame, a lamp housing having a projecting opening, mounted on the frame, a stator and a rotor on said frame, a plurality of picture strip projecting units, having projecting openings, mounted on the rotor, and adapted to move into operative relation with the lamp housing, means for moving said projecting units selectively into operative projecting position, a picture strip movable through each projecting unit, means for feeding the strip between the lamp housing and picture projecting opening of the picture strip projecting units displaying a picture, said picture strip moving means embodying upper and lower guides through which the picture strip moves, the lower guides adapted to grip and hold the picture strip moving therethrough, under a predetermined pull directed to the picture strip, and a pivoted arm adapted to intermittently exert a pressure on the picture strip between the upper and lower guides, whereby the picture strip is moved in one direction.

6. In a motion picture projecting machine, a frame, a stator and rotor mounted on said frame, a picture screen mounted on the frame, a pivoted lamp housing having a projecting opening, mounted on the frame and adapted to move into alignment with the picture screen so as to direct light rays onto the screen, a plurality of picture-projecting units having projecting openings and mounted on said rotor, adapted to move between the pivoted lamp housing and screen, means for moving said projector units selectively into operative projecting position and comprising picture strips operating within the picture-projecting units, means for moving the picture strips before the projecting openings of the lamp housing and projecting unit, a pivoted latch member carried by each projecting unit and adapted to normally hold the picture-projecting unit in its inactive position, and means including a pivoted arm mounted on the frame, adapted to release the latch member and the picture-projecting unit and said pivoted arm adapted to swing the projecting unit to its operative position before the lamp housing.

7. In a motion picture projecting machine, a frame, a lamp housing mounted on the frame, a rotary member embodying a plurality of radiating arms, mounted on the frame, a projecting unit pivotally mounted at the outer end of each arm, means for moving said projecting units selectively into operative projecting position, latch members normally holding the picture-projecting units in their inactive positions, a curved arm mounted on the rotor and adapted to engage the latch members of the picture-projecting unit as the picture-projecting units are moved to their operative projecting positions before the lamp housing, releasing said latch members, and said arms adapted to swing upwardly moving the picture-projecting units to their projecting positions before the lamp housing.

8. In a motion picture projecting machine, a supporting frame, a stator and a rotor mounted on said frame, a lamp housing pivotally mounted on the frame, a pulley housing mounted on the frame and having aligning openings in opposite side walls thereof, means for moving the lamp housing to a position before the pulley housing whereby light rays from the lamp housing will be directed therethrough, picture-projecting units mounted on the rotor and having picture-projecting openings, means for moving the picture-projecting units before the openings of the pulley housing, a picture strip carried by each picture-projecting unit, means for moving the picture strips of a projecting unit past the projecting openings thereof, said means comprising a pulley having openings aligning with the openings of the pulley housing, whereby light rays will intermittently pass through the pulley housing and picture-projecting unit held in front of the pulley housing displaying a picture, when the pulley rotates.

ARTHUR W. MILLER.
JOHN H. McMAHON.